United States Patent
Kaemingk (10) Patent No.: US 11,578,911 B2
(45) Date of Patent: Feb. 14, 2023

(54) FREEZER CASE WITH VARIABLE SUPERHEAT SETPOINTS

(71) Applicant: Hill Phoenix, Inc., Conyers, GA (US)

(72) Inventor: Nate Kaemingk, Tyrone, GA (US)

(73) Assignee: Hill Phoenix, Inc., Conyers, GA (US)

(*) Notice: Subject to any disclaimer, the term of this patent is extended or adjusted under 35 U.S.C. 154(b) by 348 days.

(21) Appl. No.: 16/871,462

(22) Filed: May 11, 2020

(65) Prior Publication Data
US 2021/0348834 A1 Nov. 11, 2021

(51) Int. Cl.
| | | |
|---|---|---|
| F25D 29/00 | (2006.01) | |
| F25D 23/02 | (2006.01) | |
| F25D 21/00 | (2006.01) | |
| F25D 21/04 | (2006.01) | |

(52) U.S. Cl.
CPC .......... *F25D 29/00* (2013.01); *F25D 21/006* (2013.01); *F25D 21/04* (2013.01); *F25D 23/02* (2013.01); *F25B 2400/22* (2013.01); *F25D 2600/04* (2013.01); *F25D 2600/06* (2013.01); *F25D 2700/02* (2013.01); *F25D 2700/122* (2013.01)

(58) Field of Classification Search
CPC .......... F25B 2400/22; F25B 2600/111; F25B 2600/112; F25B 2600/2513; F25B 2700/02; F25B 2700/2104; F25B 2700/2106; F25B 2700/21175; F25B 47/006; F25B 49/02; F25D 21/006; F25D 21/04; F25D 23/02; F25D 2600/04; F25D 2600/06; F25D 2700/02; F25D 2700/122; F25D 29/00; F25D 2400/28; F25D 2400/30; F25D 2700/12; F25D 2700/14
See application file for complete search history.

(56) References Cited

U.S. PATENT DOCUMENTS

| | | | |
|---|---|---|---|
| 10,704,823 B2 * | 7/2020 | Onishi | F25D 21/006 |
| 2009/0090114 A1 * | 4/2009 | Choo | F25D 21/006 62/208 |
| 2016/0061504 A1 * | 3/2016 | Penn, II | F25B 49/022 62/228.1 |

OTHER PUBLICATIONS

CAREL MPXone Manual, Oct. 15, 2019, 116 Pages.

* cited by examiner

*Primary Examiner* — Filip Zec (74) *Attorney, Agent, or Firm* — Fish & Richardson P.C.

(57) ABSTRACT

A freezer case includes a refrigeration system and a controller. The controller is configured to store a plurality of setpoint instruction sets associated with a plurality of possible operating modes, select a current operating mode from the plurality of possible operating modes, assign a value for the superheat setpoint by executing the setpoint instruction set associated with the current operating mode, control the refrigeration system in accordance with the superheat setpoint.

20 Claims, 6 Drawing Sheets

FREEZER CASE WITH VARIABLE SUPERHEAT SETPOINTS

BACKGROUND

The present disclosure relates to the field of refrigeration systems, in particular refrigeration systems for cases for storing and/or merchandizing frozen items (e.g., food). The present disclosure primarily relates to freezer cases for displaying and providing access to frozen products in a grocery store or similar setting (e.g., reach-in merchandizers). However, the present disclosure is not limited to the context of food retail and may be applicable to freezer cases for use in residential settings, commercial kitchens, medical facilities, and laboratory and research facilities, among other settings and applications. Additionally, although the embodiments described herein focus on freezer case (i.e., designed for low temperatures below 0° C.), the present disclosure is not limited to low-temperature freezer cases and can be adapted for use with temperature-controlled cases of various other temperatures (e.g., refrigeration cases above 0° C.).

One goal for such a display case is to store the frozen items at a consistent, below-freezing temperature. Control of refrigeration components may be complicated by various factors. For example, in a retail setting, cases may be opened frequently to allow customers to reach in and take items from the case, exposing the interior of the case to warmer, moister ambient air. The case may also be held open for extended periods of time to facilitate restocking of products into such cases, after which temperature in a case must be brought back down toward the expected, below-freezing temperature. As another example, because the temperature in a freezer case is held below the freezing point of water, moisture in the air in the case may collect as frost on products in the case. In a retail setting, consumers may have a negative perception of frost build-up on products in a display case. Operation of the refrigeration components can influence the humidity in the case, and, accordingly, the degree frost build-up on products in the case. Accordingly, a refrigerated display case with a control system configured to provide a consistent, below-freezing temperature in a display case while reducing frost collection on products therein would be advantageous.

SUMMARY

One implementation of the present disclosure is a freezer case. The freezer case includes a refrigeration system and a controller. The controller is configured to store a plurality of setpoint instruction sets associated with a plurality of possible operating modes, select a current operating mode from the plurality of possible operating modes, assign a value for the superheat setpoint by executing the setpoint instruction set associated with the current operating mode, control the refrigeration system in accordance with the superheat setpoint.

Another implementation of the present disclosure is a method for controlling a refrigeration system. The method includes storing a plurality of setpoint instruction sets associated with a plurality of possible operating modes, selecting a current operating mode from the plurality of possible operating mode, executing the setpoint instruction set associated with the current operating mode to generate a value for the superheat setpoint, and generating a control signal for the refrigeration system based on the value for the superheat setpoint.

Another implementation of the present disclosure is a reach-in merchandizer. The reach-in merchandizer includes a refrigeration cycle comprising a compressor, a condenser, an expansion valve, and an evaporator. The reach-in merchandizer also includes a case in thermal contact with the evaporator. The refrigeration cycle is operable to remove thermal energy from the case. The reach-in merchandizer also includes a controller configured to control at least one of the compressor or the expansion valve to drive a superheat value of the refrigeration cycle toward a superheat setpoint, select a steady state mode or a frost prevention mode for the refrigeration cycle, assign a first value for the superheat setpoint in response to a selection of the steady state mode, and assign a second value for the superheat setpoint in response to a selection of the frost prevention mode. The second value is greater than the first value.

DETAILED DESCRIPTION

Figure 1:
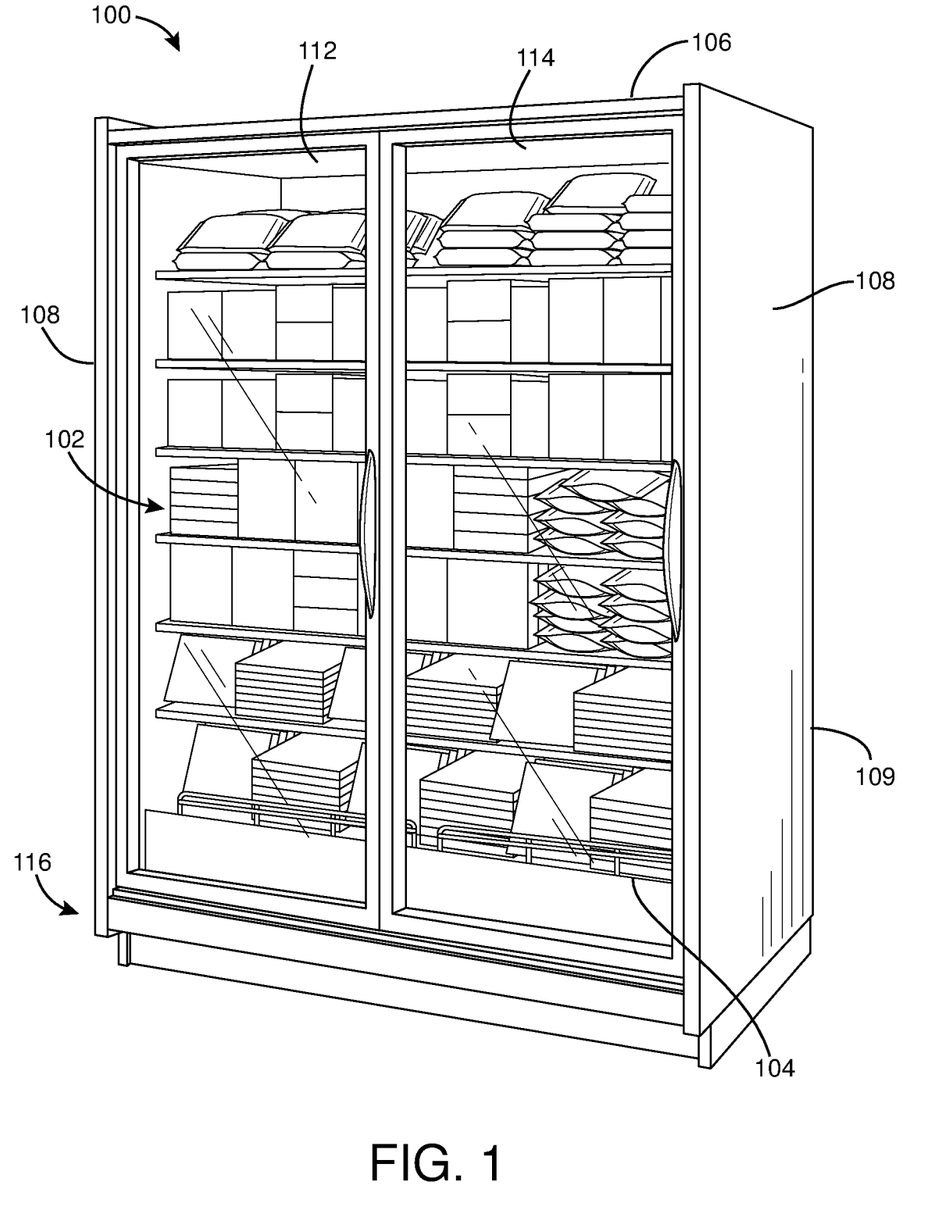
FIG. 1 is a perspective view of a freezer case according to an exemplary embodiment.

Referring now to FIG. 1, a perspective view of a freezer case 100 is shown, according to an exemplary embodiment. In the embodiment shown, the freezer case 100 is configured as a reach-in merchandizer for use in retail settings. In other embodiments, the freezer case 100 is configured for use in residential settings, commercial kitchens, medical facilities, and laboratory and research facilities, among other settings and applications. Although the embodiment shown is a freezer case intended for storage and merchandizing of frozen items, the features described herein may be adapted for use with refrigerated cases designed to maintain above-freezing temperatures.

As shown in FIG. 1, the freezer case 100 includes a temperature-controlled inner volume 102 defined by floor 104, a ceiling 106 opposite the floor, a pair of side walls 108 extending between the floor 104 and the ceiling 106, a back wall 109 joining the pair of side walls 108, the floor 104, and the ceiling 106, and a first door 112 and a second door 114 opposite the back wall 109. The floor 104, the ceiling 106, the side walls 108, and the back wall 109 may be composed of one or more layers of insulating material. Various shelving and other structures for supporting items (e.g., frozen food products) for display in the freezer case 100 may also be included.

The first door 112 and the second door 114 may each include a frame that surrounds a transparent panel (e.g., a glass panel). The first door 112 and the second door 114 are positioned on hinges and can be opened independently to allow access to the inner volume 102. In the embodiment shown, the doors 112, 114, open by rotation around axes aligned perpendicular to a ground surface supporting the freezer case 100. The first door 112 and the second door 114 may include gaskets or other sealing features to substantially prevent airflow from the ambient environment into the inner volume 102 via borders of the doors 112, 114 when the doors 112, 114 are closed. The first door 112 and the second door 114 thereby provide visibility into the inner volume 102 of the freezer case 100 when closed, and can be opened to provide physical access to the inner volume 102 of the freezer case 100. In some embodiments, the freezer case 100 includes one or more sensors configured to detect when the first door 112 and/or the second door 114 is opened and/or closed.

Figure 2:
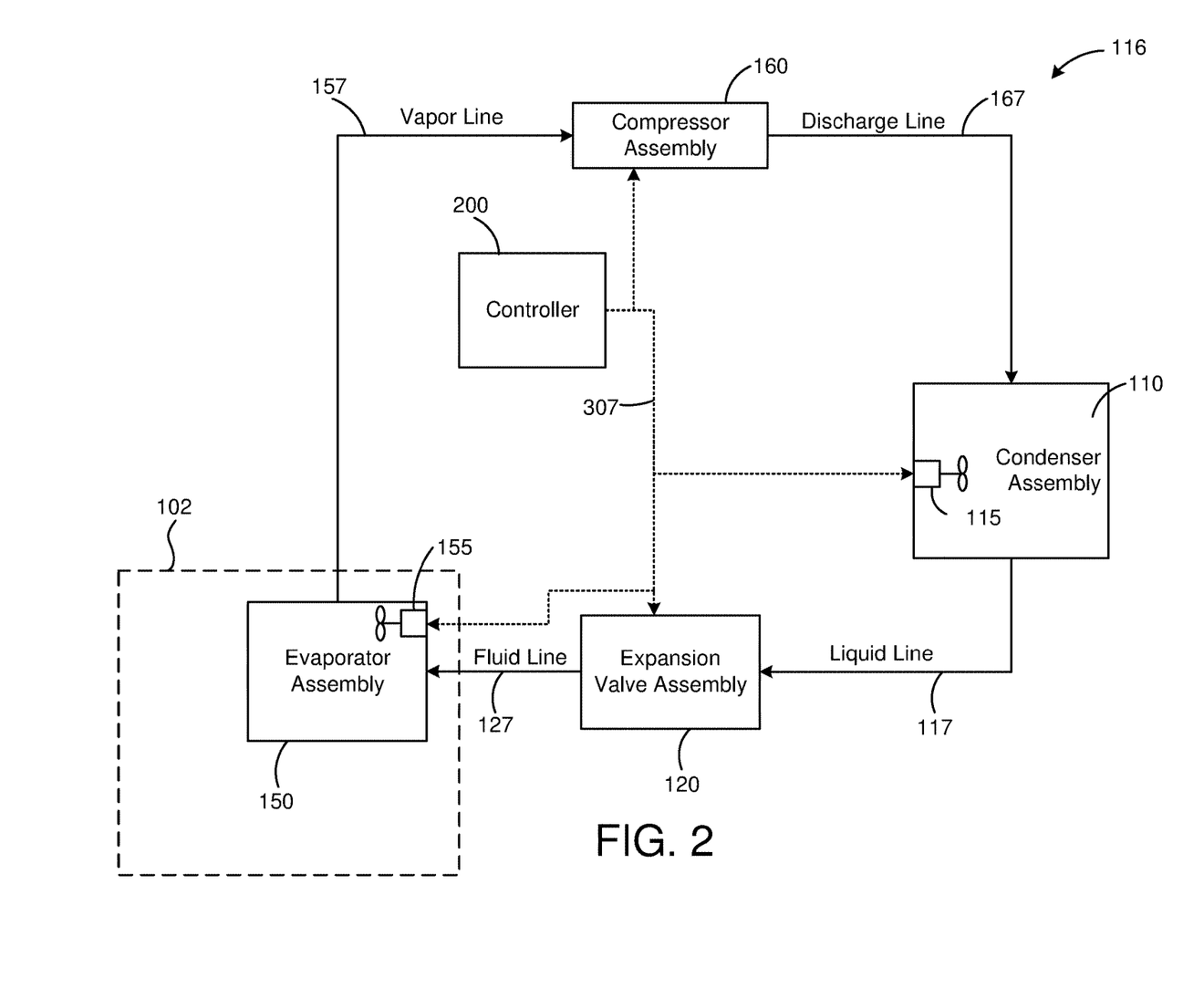
FIG. 2 is a block diagram of a refrigeration cycle components of a freezer case, according to an exemplary embodiment.

The freezer case 100 also includes a refrigeration system 116 configured to affect environmental conditions in the inner volume 102. In the embodiment shown, the refrigeration system 116 is provided at a bottom section of the freezer case 100, shown as below the floor 104. In other embodiments, the refrigeration system 116 may be provided at a top, back, or side of the freezer case 100. The refrigeration system 116 is configured to remove thermal energy from the inner volume 102. The refrigeration system 116 is also configured to remove humidity from the inner volume 102. An example embodiment of the refrigeration system 116 is shown in FIG. 2 and described in detail with reference thereto. The refrigeration system 116 of the freezer case 100 may be controlled to establish a substantially consistent temperature in the inner volume 102 of the freezer case 100 and to reduce or prevent frost accumulation on products stored in the freezer case 100.

The embodiment of the freezer case 100 shown in FIG. 1 is included for example purposes. Various designs are contemplated by the present disclosure. For example, in other embodiments, different numbers of doors are provided (e.g., 1, 3, 4, 5, etc.). In some embodiments, the doors 112, 114 are opaque and/or open by rotating around an axis aligned parallel to a ground surface supporting the freezer case 100 (i.e., configured as a top-opening chest). It should be understood that various features, control approaches, etc. described herein may be applied with cases having various designs, physical layouts, dimensions, and applications.

Referring now to FIG. 2, a block diagram of a refrigeration system 116 is shown, according to an exemplary embodiment. The refrigeration system 116 as shown in FIG. may be included with the freezer case 100 as shown in FIG. 1. The refrigeration system 116 is coupled to and configured to control the temperature and humidity of the inner volume 102.

The refrigeration system 116 includes a refrigerant disposed therein. The refrigerant cycles through the refrigeration system 116 and is configured to facilitate thermal energy exchange throughout the refrigeration system 116.

The refrigeration system 116 includes a compressor assembly 160. The compressor assembly 160 is configured to increase the pressure of the refrigerant as the refrigerant flows through the compressor assembly 160. As pressure increases, the temperature of the refrigerant also increases.

The refrigeration system 116 includes a condenser assembly 110 coupled to the compressor assembly 160 by a discharge line 167, such that the refrigerant flows from the compressor assembly 160 to the condenser assembly 110. The condenser assembly 110 is configured to facilitate thermal energy loss from the refrigerant. The condenser assembly 110 includes a fan 115 configured to assist in the thermal energy loss and a heat exchanger (e.g., coil) through which the refrigerant flow. The fan 115 blows ambient air across the heat exchanger to facilitate heat transfer out of the refrigerant.

The refrigeration system 116 includes an expansion valve assembly 120 coupled to the expansion valve assembly 120 by liquid line 117. The expansion valve assembly 120 is configured to provide a pressure drop in the refrigerant as the refrigerant flows through an opening in a valve of the expansion valve assembly 120. The expansion valve assembly 120 includes an actuator coupled to the valve and operable to vary a size of the opening through the valve, which affects the pressure drop across the valve. Accordingly, the expansion valve assembly 120 can be controlled to vary the amount of pressure drop across expansion valve assembly 120. During the pressure drop, the refrigerant changes phase from a liquid to a vapor.

The refrigeration system 116 includes an evaporator assembly 150 coupled to the expansion valve assembly 120 by a fluid line 127. The refrigeration system is configured such that the refrigerant flows from the condenser assembly 110, through the expansion valve assembly 120, to the evaporator assembly 150, and then back to the compressor assembly 160. The evaporator assembly 150 includes a heat exchanger (e.g., a coil) through which the refrigerant flows and a fan 155 configured to blow air across the heat exchanger.

The evaporator assembly 150 is positioned at the inner volume 102, such that the heat exchanger of the evaporator assembly 150 is in thermal contact the air of the inner volume 102 and the fan 155 is configured to move air through the inner volume 102. The evaporator assembly 150 is configured to facilitate thermal energy transfer from the air in the inner volume 102 to the refrigerant. Thermal energy can be transferred from the inner volume 102 to the refrigerant when the refrigerant is at a lower temperature than the inner volume 102. When the thermal energy transfer into the refrigerant is equal to the amount of thermal energy transfer into the inner volume 102 from an ambient environment (e.g., transferred through the floor, ceiling, back wall, side walls, and doors of the freezer case 100, transferred when a door 112, 114 is open, transferred from warmer items placed in the inner volume 102), the temperature is in the inner volume 102 is held at a substantially constant value. When the thermal energy transfer into the refrigerant is greater than the amount of thermal energy transfer into the inner volume 102 from an ambient environment, the temperature of the air in the inner volume 102 decreases. Thermal energy transfer into the refrigerant is also associated with removal of moisture from the inner volume 102.

As the temperature of refrigerant increases in the evaporator assembly 150, the refrigerant evaporates from a liquid (or combination of liquid and vapor) to a vapor. To allow for proper operation of the refrigeration system 116, the refrigerant is composed entirely of vapor at an outlet of the evaporator assembly 150. In order to ensure that the refrigerant is composed entirely of vapor, the refrigerant must increase in temperature to greater than a boiling point of the refrigerant in the evaporator assembly 150. The difference in temperature between an actual temperature of the refrigerant at an outlet of the evaporator assembly 150 and a boiling point of the refrigerant is known as the superheat.

Figure 6:
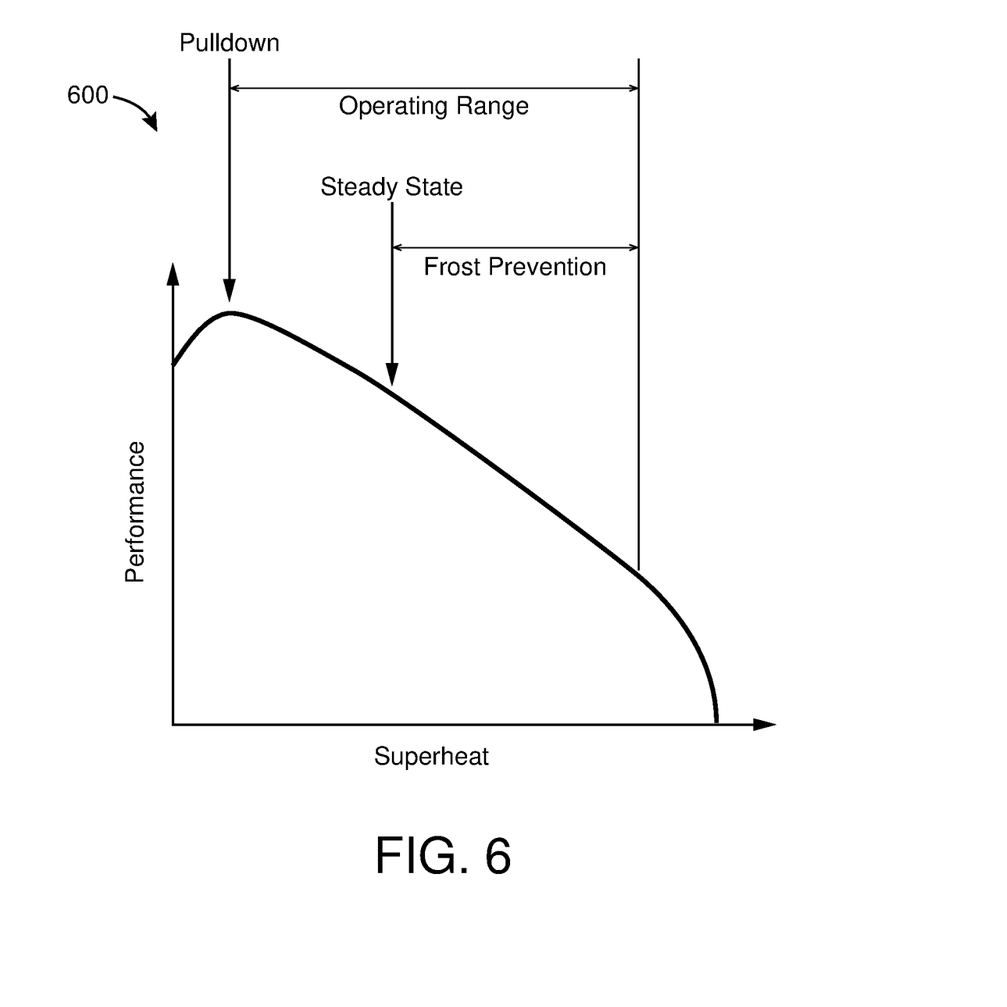
FIG. 6 is a graph illustrating various operating modes and superheat setpoints for a freezer case, according to an exemplary embodiment.

The performance of the refrigeration system 116 is affected by the value of the superheat. As the superheat value increases, the refrigerant is vapor in a higher percentage of the evaporator assembly 150 and the cooling provided to the inner volume 102 decreases. As the superheat value decreases, the refrigerant is liquid in higher percentage of the evaporator assembly 150 and the cooling provided to the inner volume 102 increases. FIG. 6 shows a graph including a depiction of performance charted against superheat for the refrigeration system 116.

The superheat can change based on the operation of various components of the refrigeration system 116 and based on conditions in the inner volume 102 of the freezer case 100. For example, changes in the operation of the compressor assembly 160 (e.g., power consumption of the compressor assembly 160, frequency of the compressor assembly 160, etc.), alteration of a size of an opening through a valve of the expansion valve assembly 120, and the speed/power consumption of the fan 115 of the condenser assembly 110 and the fan 260 of the evaporator assembly, can affect the superheat. The temperature and humidity in the inner volume 102 of the case 100 may also influence the superheat.

The refrigeration system 116 also includes a controller 200. The controller 200 is configured to send and receive control signals to each of the components of the refrigeration system 116. As shown, the controller 200 is communicably coupled to and configured to control the fan 115 via control line (e.g., conductive path, wire, cable, etc.) 307, the fan 155 via control line 357, the compressor assembly 160 via control line 367, and the expansion valve assembly 120 via control line 397. In various embodiments, the control lines may be configured to facilitate the exchange of data, signals (e.g., analog or digital), power, etc. The controller 200 is configured to generate control signals for the fans 115, the compressor assembly 160, and/or the expansion valve assembly 120 following processes and configurations described in detail below.

Figure 3:
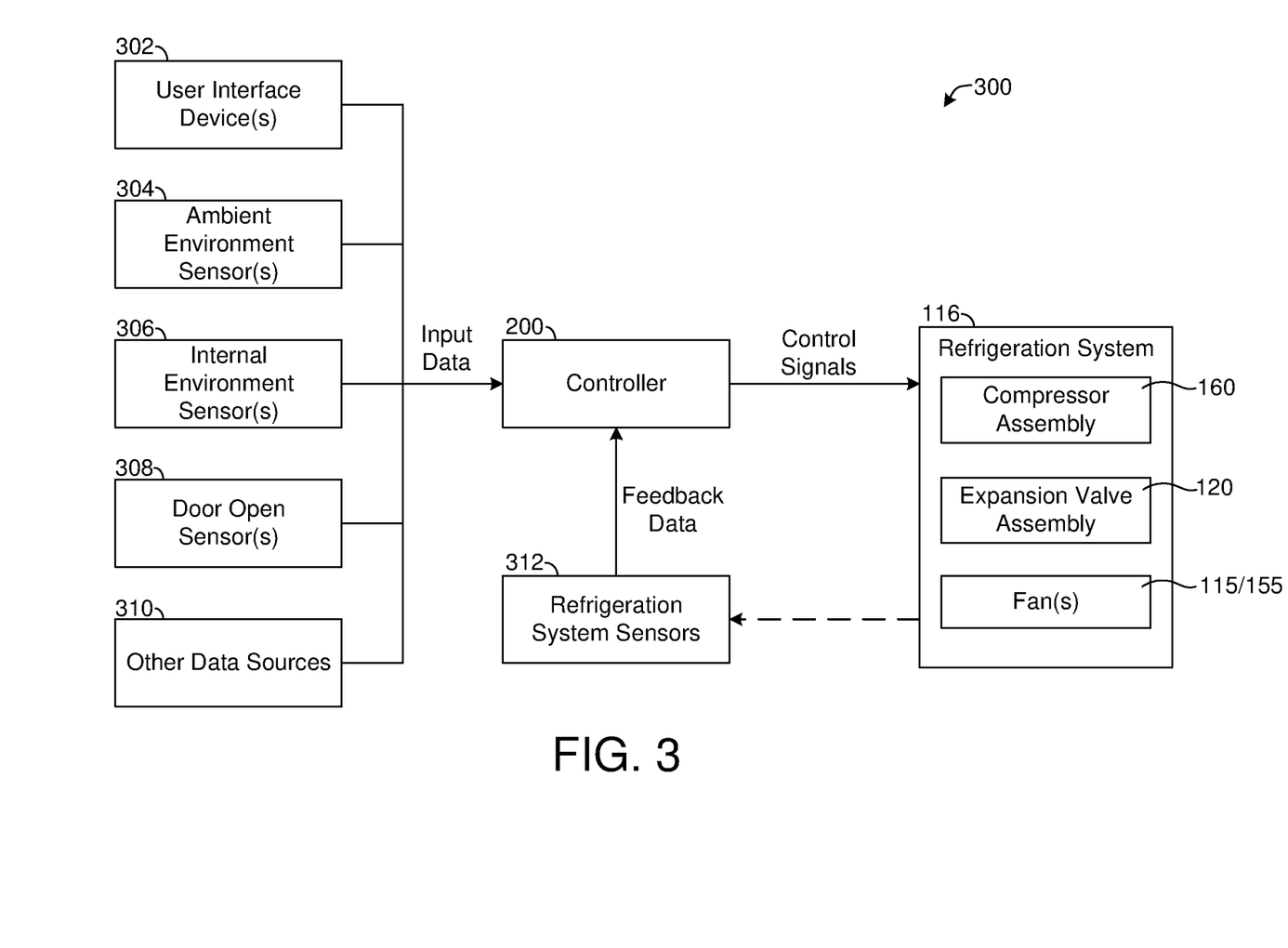
FIG. 3 is a block diagram of a control system for the refrigeration cycle components of a freezer case, according to an exemplary embodiment.

Referring now to FIG. 3, a block diagram of a control architecture 300 for use with the freezer case 100 and the refrigeration system 116 is shown, according to an exemplary embodiment. The freezer case 100 may include some or all components of the control architecture 300 of FIG. 3.

As shown in FIG. 3, the control architecture 300 includes the controller 200 of FIG. 2. The controller 200 is shown as receiving input data from multiple data sources. In the example shown, the control architecture 300 includes one or more user interface devices 302, one or more ambient environment sensors 304, one or more internal environment sensors 306, one or more door open sensors 308, and other data sources 310, all of which are configured to obtain and provide input data to the controller 200 as described below.

The one or more user interface devices 302 are configured to receive user input relating to operation of the freezer case 100 and provide data indicative of the user input to the controller 200. The user input may relate to temperature setpoints for the inner volume 102 of the freezer case 100, on/off commands for the freezer case 100, operating schedules relating to the freezer case 100 (e.g., indicating a stocking schedule/time for a freezer case 100 in a retail setting), and/or other commands for the freezer case 100. In some embodiments, the one or more user interface devices 302 include one or more displays, indicator lights, speakers, buttons, knobs, switches, etc. included on the freezer case 100. In some embodiments, the one or more user interface devices 302 are provided as user personal computing devices (e.g., smartphones, tablets, laptop or desktop computer) communicable with the controller 200 via a network (e.g., WiFi, Bluetooth, Internet, Intranet).

The one or more ambient environment sensors 304 are included with the freezer case 100 and are configured to measure conditions of the ambient environment at the freezer case 100. For example, the ambient environment sensors 304 may measure temperature and humidity of ambient air outside the freezer case 100. In some embodiments, other conditions which may affect heat transfer to the freezer case may be measured by the ambient environment sensors 304, for example airflow and incident light (e.g., solar irradiance).

The one or more internal environment sensors 306 are included with the freezer case 100 and are configured to measure conditions of the environment within the inner volume 102 of the freezer case 100. For example, the one or more internal environment sensors 306 may measure temperature and humidity of the air in the inner volume 102. As another example, an anemometer may be provided that measures airflow in the inner volume 102 (e.g., airflow generated by the fan 155). That is, the one or more internal environment sensors 306 measure conditions of the inner volume 102 that can be affected by operation of the refrigeration system 116.

The one or more door open sensors 308 are included with the freezer case 100 and configured to detect when the first door 112 and/or the second door 114 are opened. For example, the door open sensors 308 may include magnetic contacts positioned on the first door 112 and the second door 114, and corresponding contacts on a frame for the doors, such that the alignment of the contacts is used to detect that a door is closed and lack of alignment is used to detect that a door is open. The door open sensors 308 may provide data indicative of occurrence of door open events, a duration of time that a door is left open, a frequency of door opening events, etc.

The other data sources 310 include other sensors, databases, computer systems, etc. that may be relevant to operation of the freezer case 100. For example, the other data sources 310 may include an inventory system that can be used to predict when the freezer case 100 will need to be restocked. As another example, the other data sources 310 may include a building HVAC system that can provide data indicative of ambient conditions in a building that houses the freezer case 100. Various other data sources are possible in various embodiments.

The controller 200 is configured to receive the various input data from the one or more user interface devices 302, one or more ambient environment sensors 304, one or more internal environment sensors 306, one or more door open sensors 308, and other data sources 310. In the embodiments shown, the controller 200 is provided locally as a component of the freezer case 100. In other embodiments, various processes attributed to the controller 200 may be executed remotely, for example by a cloud computing resource in communication with the freezer case 100.

As described in detail below with reference to FIGS. 4-6, the controller 200 is configured to select a current operating mode for the freezer case based on the input data from the various sensors. In some embodiments, feedback data from one or more refrigeration system sensors 312 that measure operating parameters of the refrigeration system. The current operating mode is selected from a set of available operating modes, which may include a pulldown mode, a steady state mode, and a frost prevention mode, among other possibilities. The controller 200 stores a setpoint instruction set for each of the available operating modes. Each setpoint instruction set includes machine-executable computer code executable by the controller 200 to generate a value for a superheat setpoint, i.e., a target value for the superheat of the refrigeration system 116. For any particular point in time, the controller 200 is configured to execute the setpoint instruction set for the current operating mode to generate a superheat setpoint for that point in time.

The controller 200 is then configured provide feedback control configured to drive the actual superheat of the refrigeration system 116 toward the superheat setpoint. As shown in FIG. 3, the controller 200 is configured to generate control signals for transmission to components of the refrigeration system 116. As shown, the controller 200 is configured to control the compressor assembly 160, the expansion valve assembly 120, and the fans 115, 155 that move air across the condenser assembly 110 and the evaporator assembly 150.

Control of these components of the refrigeration system 116 affects the behavior and conditions of the refrigerant moving through the refrigeration system 116. As shown in FIG. 3, the control architecture 300 includes one or more refrigeration system sensors 312 that may be included with the refrigeration system 116. The one or more refrigeration system sensors 312 are configured to measure one or more conditions (e.g., temperature, pressure) of the refrigerant at one or more points in the refrigeration cycle, and/or other operating parameters of the refrigeration system 116 (e.g., fan speed, fan motor power). For example, a sensor may be included to measure a temperature of the refrigerant at an outlet of the evaporator assembly 150, which may be indicative of an actual (real-time, current, etc.) superheat of the refrigeration system 116. The data collected by the refrigeration system sensors 312 is provided to the controller 200 as feedback data. The control architecture 300 thereby provides a feedback loop for controlling the superheat of the refrigeration system 116 to a setpoint generated by the controller 200.

Figure 4:
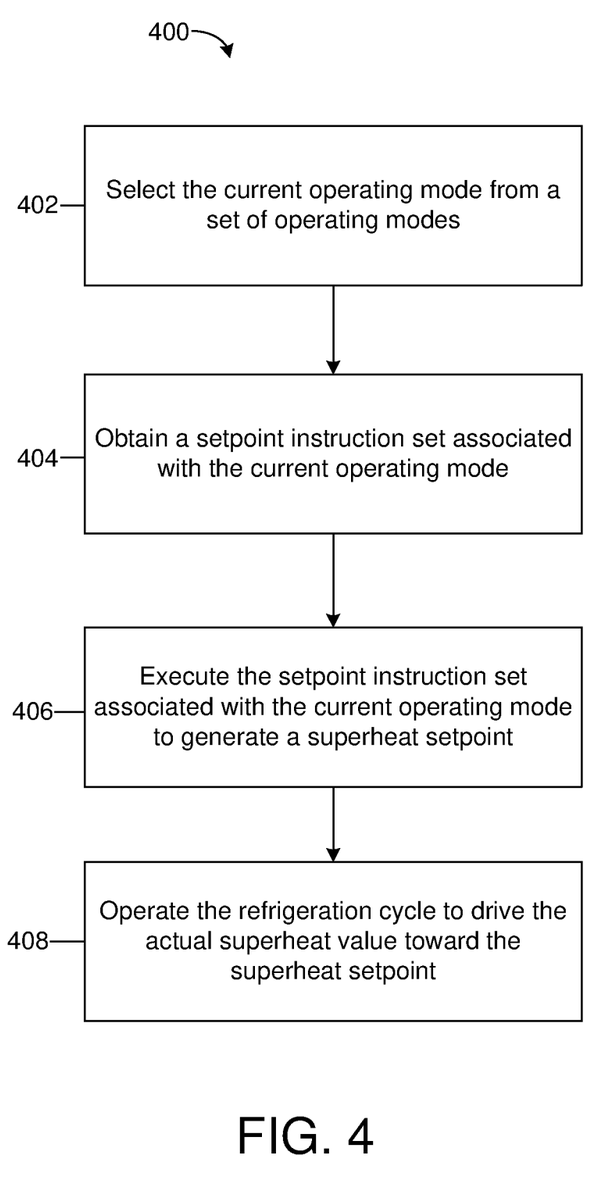
FIG. 4 is a flowchart of a process for controlling the refrigeration system of a freezer case, according to an exemplary embodiment.

Referring now to FIG. 4, a flowchart of a process 400 for controlling the refrigeration system of a freezer case is shown, according to an exemplary embodiment. In some embodiments, the process 400 can be executed by the controller 200 of the control architecture 300 of FIG. 3.

At step 402, the process 400 includes selecting a current operating mode from a set of possible operating modes. The current operating mode can be selected based on various data, for example input data from the one or more user interface devices 302, one or more ambient environment sensors 304, one or more internal environment sensors 306, one or more door open sensors 308, and other data sources 310 and/or feedback data from the refrigeration system sensors 312 of FIG. 3. For example, step 402 can include selecting the current operating mode based on one or more of: air temperature in the inner volume 102, humidity in the inner volume 102, ambient air temperature, ambient humidity, ambient air flow, door opening events, fan speed, fan motor resistance, air flow in the inner volume 102 (anemometer readings across a coil from a fan), expansion valve position, product temperature sensors, or shelf temperature sensors, among other possibilities.

In some embodiments, the set of possible operating modes includes a pulldown mode, a steady state mode, and a frost prevention mode. The pulldown mode is configured to facilitate rapid decrease in temperature of the inner volume 102, for example on initial start-up, after stocking of the case, or in some other scenario where the temperature at the inner volume 102 is substantially higher than a temperature setpoint for the freezer case 100. The steady state mode is configured to cause the temperature in the inner volume 102 to be held at or near (e.g., within a deadband around) a temperature setpoint. The frost prevention mode is configured to cause the refrigeration system 116 to operate to prevent or reduce the accumulation of frost on products in the inner volume 102.

In some embodiments, step 402 includes the example selection process shown in FIG. 5 and described in detail with reference thereto. In other embodiments, various rules-based logic, classification systems (e.g., machine-learning classification systems, neural network classifiers, etc.), look-up tables, or other approaches can be used to selecting the current operating mode from a set of possible operating modes.

At step 404, a setpoint instruction set associated with the current operating mode is obtained. For example, the controller 200 may store a setpoint instruction set for each of the possible operating modes, and obtain the relevant set of instructions based on the current operating mode identified in step 402. The setpoint instruction set includes instructions (logic, algorithmic steps, computer-readable programming, etc.) configured to generate a setpoint for the refrigeration system 116. Each operating mode may have a different setpoint instruction set, such that the logic for determining the setpoint for the refrigeration system 116 is different across the various possible operating modes. In the embodiments described herein, the setpoint generated by executing the setpoint instruction set is a superheat setpoint, which defines a target value for the superheat of the refrigeration system 116. In other embodiments, setpoints for one or more other variables may be generated by the setpoint instruction set.

At step 406, the setpoint instruction set associated with the current operating mode (i.e., obtained at step 404) is executed to generate a superheat setpoint. The controller 200 can execute the setpoint instruction set at step 406. In some embodiments, executing the setpoint instruction set includes receiving various input and/or feedback data from the one or more user interface devices 302, one or more ambient environment sensors 304, one or more internal environment sensors 306, one or more door open sensors 308, and other data sources 310 and/or feedback data from the refrigeration system sensors 312.

As one example, executing the setpoint instruction set may be executed to generate a superheat setpoint $S_{sp}$ as follows. If the pulldown mode is selected, the setpoint instruction set may be executed to set the superheat setpoint $S_{sp}$ to the minimum superheat within the operational limits of the refrigeration system 116, denoted as $S_{min}$. Selecting $S_{sp}=S_{min}$ in the pulldown mode allows provides a maximized rate of heat transfer from the case into the refrigerant to pull down the temperature of the internal volume 102 ($T_{case}$) as quickly as possible.

To continue the example, if the steady state mode is selected, the setpoint instruction set may be executed to set the superheat setpoint $S_{sp}$ to a moderate value between the minimum and maximum operational limits of the refrigeration system 116, denoted here as $S_{ss}$. The setpoint instruction set may also provide for on/off cycling to avoid over-cooling the case. For example, the setpoint instruction set for the steady state mode may provide:

$$S_{sp} = \begin{cases} S_{ss}, & T_{case} > T_{sp} + \Delta \\ 0, & T_{case} < T_{sp} - \Delta \end{cases},$$

where $T_{sp}$ is a temperature setpoint for the case and a deadband of width $2\Delta$ is provided such no change in control occurs between $T_{sp}-\Delta$ and $T_{sp}+\Delta$ to avoid constant activation/deactivating cycling.

To continue the example further, if the frost prevention mode is selected, the setpoint instruction set may be executed to set the superheat setpoint $S_{sp}$ to time-varying values greater than the steady state setpoint $S_{ss}$ and less than a maximum superheat within the operating limits of the refrigeration system 116 ($S_{max}$). Selecting $S_{sp}(t) > S_{ss}$ provides for deliberately less-efficient operation of the refrigeration system and lower heat transfer out of the case in the frost prevention mode relative to the steady state mode and pulldown mode. However, with $S_{sp}(t) < S_{max}$, operation of the refrigeration system pulls moisture out of the air in the inner volume 102, thereby reducing or preventing accumulation of frost on products in the case.

The setpoint instruction set for the frost prevention mode may be configured to maximize frost mitigation without over-cooling the case. For example, in some embodiments, the setpoint instruction set for the frost prevention mode provides:

$$S_{sp} = \begin{cases} F(X), & T_{case} > T_1 \\ S_{max}, & T_1 > T_{case} > T_2 \\ 0, & T_2 > T_{case} \end{cases}$$

where $T_1$ is a first threshold temperature below the case temperature setpoint $T_{sp}$, $T_2$ is an absolute minimum acceptable temperature for the case, and $F(X)$ is a function of various data available in the control architecture 300 with outputs bounded as $S_{ss} < F(X) < S_{max}$. The function $F(X)$ may be designed to maximize the amount of time that there is a cool spot in the coil of the evaporator assembly 150 to pull moisture out of the air in the inner volume 102. Also, although not shown explicitly in this formulation, some degree of deadband control may be provided to avoid repeated control cycling at the boundaries $T_1$, $T_2$.

A setpoint for the superheat can thus be generated at step 406. FIG. 6 includes a graph 600 that illustrates superheat setpoints that can be generated using this approach. As shown, the pulldown mode superheat setpoint is provided at a minimum superheat value, a steady state setpoint is provided at an intermediate value, and a frost prevention setpoint is provided in a range varying between the steady state setpoint and a maximum superheat value. Performance (e.g., heat transfer) of the evaporated is also shown in the graph 600, illustrating that less heat transfer is provided at higher superheat values. Accordingly, the graph 600 illustrates that less heat transfer is provide in the frost prevention mode relative to the pulldown mode. It should be understood that although example formulations for the setpoint instructions sets are provided herewith, other logic and algorithms are also contemplated by the present disclosure.

At step 408, the refrigeration cycle is operated to drive the actual superheat value toward the superheat setpoint. For example, the controller 200 can provide control outputs to the compressor assembly 160, the expansion valve assembly 120, and/or one or both fans 115/155 of the refrigeration system 116 based on the superheat setpoint $S_{sp}$ generated in step 406. In some embodiments, the controller 200 is configured to map each value of the superheat setpoint $S_{sp}$ to a valve position for the expansion valve assembly 120, and control the expansion valve assembly 120 to actuate the valve to the position corresponding to the superheat setpoint $S_{sp}$. In other embodiments, the controller 200 provides feedback control that uses measurements from the refrigeration system 116, for example a temperature measurement indicative of an actual superheat value from a refrigeration system sensor 312, to generate control signals configured to drive the measured/actual superheat value toward the superheat setpoint. Various feedback control approaches can be used, for example proportional-integral control or proportional-integral-derivative control. The refrigeration system 116 is thereby controlled to achieve a superheat suitable for the operating mode selected in step 402.

Figure 5:
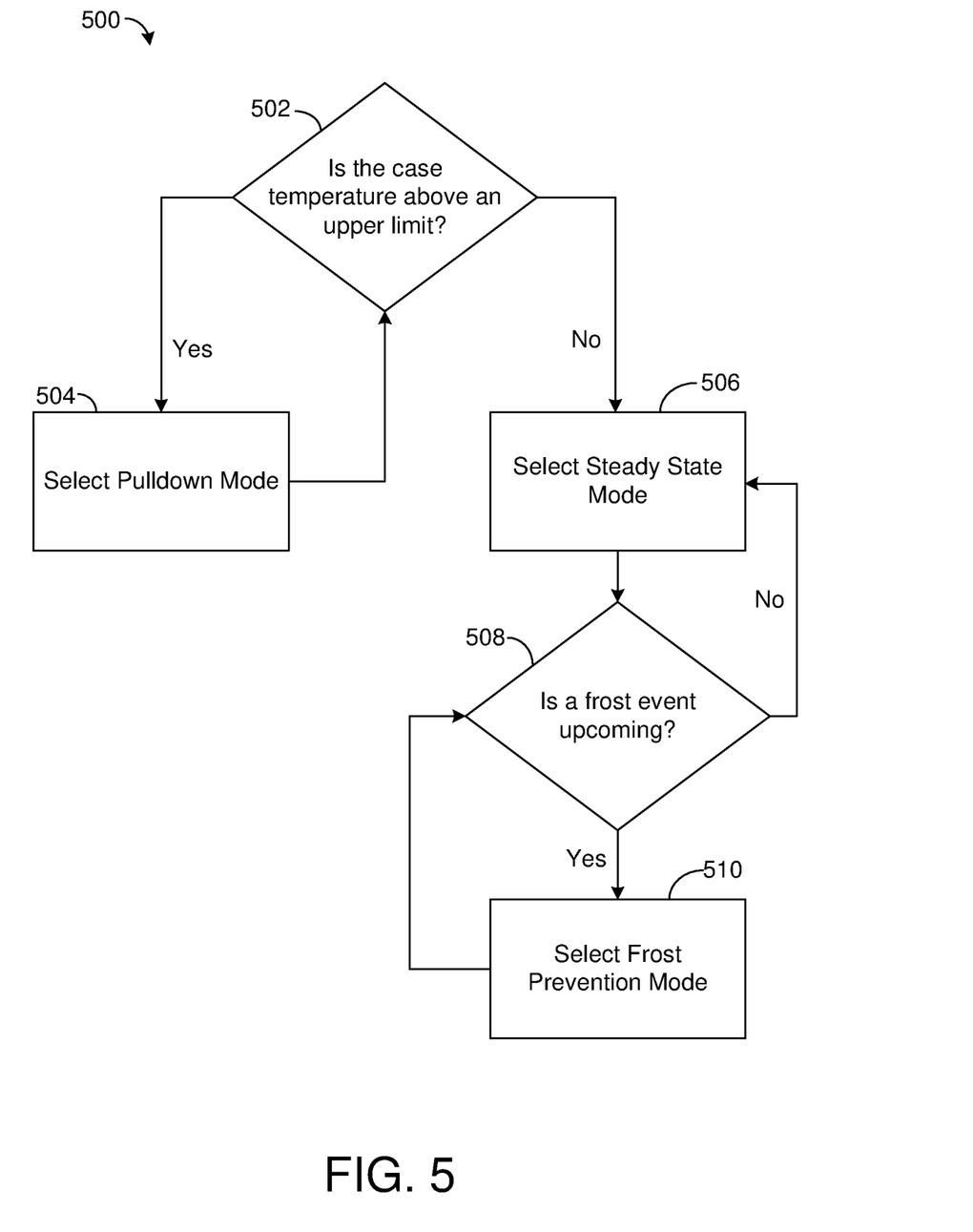
FIG. 5 is a flowchart of a process for selecting an operating mode for a freezer case, according to an exemplary embodiment.

Referring now to FIG. 5, a flowchart of a process 500 for selecting a current operating mode is shown, according to an exemplary embodiment. Process 500 is an example embodiment of step 402 of FIG. 4. In some embodiments, the process 500 can be executed by the controller 200 of the freezer case 100 and the control architecture 300.

At step 502, a determination of whether the case temperature $T_{case}$ (e.g., within inner volume 102) is greater than an upper limit $T_{upper}$ is made. The upper limit may be a temperature value corresponding to a warm freezer case, which needs to be reduce substantially to meet a temperature setpoint $T_{sp}$ for the case. For example, in some embodiments, $T_{upper} = T_{sp} + d$, where d is an acceptable deviation from the temperature setpoint $T_{sp}$. For example, in various embodiments d may have a value between five and twenty degrees Fahrenheit.

If the case temperature $T_{ease}$ is greater than the upper limit $T_{upper}$, then the pulldown mode is selected at step 504. The pulldown mode may be provided as described above with reference to FIG. 4. The pulldown mode may be continued to be provided until the case temperature $T_{case}$ is less than the upper limit $T_{upper}$. That is, step 502 may be executed continuously or periodically to determine whether the case temperature $T_{case}$ has passed below the upper limit $T_{upper}$.

If step 502 results in a determination that $T_{case}$ is less than the $T_{upper}$, the steady state mode is selected at step 506. The steady state mode can be executed as described in detail above with reference to FIG. 4.

The process 500 may additionally continue on to step 508, where a determination is made regarding whether a frost event is upcoming. For example, the controller 200 can be configured to predict frost events, i.e., conditions or moments that are predicted to result in frost accumulation on products in the case if mitigation steps are not taken. Frost events can be predicted based on fan speed, air temperature in the case, door opening events, ambient temperature and humidity, and/or expansion valve position, in some embodiments. In some embodiments, other values are also or alternatively used, for example internal case humidity, fan motor resistance (which may reveal coil blockage), anemometer data (e.g., internal airflow measurements in the inner volume 102), product temperature, or shelf temperature. In some embodiments, the frost event prediction is achieved using a machine-learning approach (e.g., artificial neural network) configured to predict frost events based on multiple such input data points, or some other advanced predictive modeling and fault detection approach (e.g., principal component analysis). In some embodiments, a parametric equation or a set of look-up tables is used to determine whether a frost event is upcoming. A frost event may be predicted due to high instantaneous frost risk (e.g., in extreme conditions) or based on time spent a lower-risk levels (e.g., when the integration of lower risk over time reaches a threshold value). Various approaches to frost modeling and frost event prediction are contemplated by the present disclosure.

If no frost event is predicted, the steady state mode remains selected as shown at step 506. If a frost event is predicted, the frost prevention mode is selected at step 510. The frost prevention mode may then be provided as described above with reference to FIG. 4. Step 508 may be continuously or periodically executed to recheck whether a frost event is upcoming. For example, after intervention by the frost prevention mode, the frost event may be sufficiently mitigated or prevented to the point where the steady state mode can be selected. The process 500 thereby provides for switching between the pulldown mode, the steady state mode, and the frost prevention mode provided in some embodiments of process 400 of FIG. 4.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims. It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The construction and arrangement of the elements of the refrigeration system and valve diagnostic system as shown in the exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The hardware and data processing components (e.g., controller 200) used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

It is important to note that the construction and arrangement of the systems and methods as shown in the various exemplary embodiments is illustrative only. Additionally, any element disclosed in one embodiment may be incorporated or utilized with any other embodiment disclosed herein. For example, the methods of the exemplary embodiment described in at least paragraph(s) [0039] may be incorporated with any of the components of the refrigeration system of the exemplary embodiment described in at least paragraph(s) [0018]. Although only one example of an element from one embodiment that can be incorporated or utilized in another embodiment has been described above, it should be appreciated that other elements of the various embodiments may be incorporated or utilized with any of the other embodiments disclosed herein.

It should further be noted that for purposes of this disclosure, the term "coupled" means the joining of two members directly or indirectly to one another. Such joining may be stationary in nature or moveable in nature and/or such joining may allow for the flow of fluids, transmission of forces, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

What is claimed is:

1. A freezer case, comprising:
a refrigeration system; and
a controller configured to:
store a plurality of setpoint instruction sets associated with a plurality of possible operating modes;
select a current operating mode from the plurality of possible operating modes;
assign a value for a superheat setpoint by executing the setpoint instruction set associated with the current operating mode; and
control the refrigeration system in accordance with the superheat setpoint.

2. The freezer case of claim 1, wherein the plurality of possible operating modes comprise a pulldown mode, a steady state mode, and a frost prevention mode.

3. The freezer case of claim 1, wherein the value for the superheat setpoint is suitable for achieving a desired thermodynamic behavior of the refrigeration system associated with the current operating mode.

4. The freezer case of claim 1, wherein a first setpoint instruction set associated with a first operating mode comprises a first pre-defined static value for the superheat setpoint and a second setpoint instruction associated with a second operating mode comprises a second pre-defined static value for the superheat setpoint.

5. The freezer case of claim 1, wherein the setpoint instruction set associated with the current operating mode is executable to generate time-varying values for the superheat setpoint.

6. The freezer case of claim 1, wherein the freezer case comprises a transparent door.

7. The freezer case of claim 1, wherein the controller is configured to select the current operating mode based on an internal temperature of the freezer case.

8. The freezer case of claim 1, wherein the controller is configured to select the current operating mode based on tracked openings of a door of the freezer case.

9. The freezer case of claim 1, wherein the controller is configured to select the current operating mode by predicting an occurrence of frost accumulation in the freezer case.

10. A method for controlling a refrigeration system, comprising:
storing a plurality of setpoint instruction sets associated with a plurality of possible operating modes;
selecting a current operating mode from the plurality of possible operating modes;
executing the setpoint instruction set associated with the current operating mode to generate a value for a superheat setpoint;
generating a control signal for the refrigeration system based on the value for the superheat setpoint.

11. The method of claim 10, wherein executing the setpoint instruction set comprises reading a pre-defined static value for the superheat setpoint from the setpoint instruction set.

12. The method of claim 10, wherein executing the setpoint instruction set comprises generating time-varying values for the superheat setpoint.

13. The method of claim 10, wherein the plurality of possible operating modes comprise a pulldown mode, a steady state mode, and a frost prevention mode.

14. The method of claim 13, comprising switching from the steady state mode to the frost prevention mode by increasing the value for the superheat setpoint and reducing an efficiency of the refrigeration equipment.

15. The method of claim 13, wherein:
executing the setpoint instruction set associated with the pulldown mode comprises generating a first value for the superheat setpoint;
executing the setpoint instruction set associated with the steady state mode comprises generating a second value for the superheat setpoint; and
the second value is greater than the first value.

16. The method of claim 15, wherein:
executing the setpoint instruction set associated with the frost prevention mode generates time-varying values for the superheat setpoint; and
the time-varying values are greater than the second value.

17. A reach-in merchandizer, comprising:
a refrigeration cycle comprising a compressor, a condenser, an expansion valve, and an evaporator;
a case in thermal contact with the evaporator, wherein the refrigeration cycle is operable to remove thermal energy from the case;
a controller configured to:
control at least one of the compressor or the expansion valve to drive a superheat value of the refrigeration cycle toward a superheat setpoint;
select a steady state mode or a frost prevention mode for the refrigeration cycle;
in response to a selection of the steady state mode, assign a first value for the superheat setpoint;
in response to a selection of the frost prevention mode, assign a second value for the superheat setpoint, the second value greater than the first value.

18. The reach-in merchandizer of claim 17, wherein:
the refrigeration cycle operates at a lower energy efficiency in the frost prevention mode than in the steady state mode; and
the refrigeration cycle is configured to dehumidify air when the superheat value is at the second value.

19. The reach-in merchandizer of claim 17, wherein the controller is configured to select the steady state mode or the frost prevention mode for the refrigeration cycle by predicting a frost event based on input data relating to the reach-in merchandizer, the frost event indicative of future frost accumulation on products in the case.

20. The reach-in merchandizer of claim 17, wherein second value for the superheat setpoint is at a maximum operating limit for the superheat value of the refrigeration cycle.

\* \* \* \* \*